(12) United States Patent
Holzapfel

(10) Patent No.: US 6,199,954 B1
(45) Date of Patent: Mar. 13, 2001

(54) BELT TENSIONER WITH LINEAR DRIVE

(75) Inventor: Volker Holzapfel, St. Wendel (DE)

(73) Assignee: TRW Occupany Restraint Systems GmbH & Co., KG, Alfdorf (DE)

( * ) Notice: Subject to any disclaimer, the term of this patent is extended or adjusted under 35 U.S.C. 154(b) by 0 days.

(21) Appl. No.: 09/282,264

(22) Filed: Mar. 31, 1999

(30) Foreign Application Priority Data

Apr. 3, 1998 (DE) .......................................... 298 06 199 U

(51) Int. Cl.⁷ .................................................. B60R 21/00
(52) U.S. Cl. ............................................ 297/479; 297/480
(58) Field of Search .................................. 297/480, 464, 297/473, 463.1, 474, 479; 280/806, 807, 801.1

(56) References Cited

U.S. PATENT DOCUMENTS

| | | | |
|---|---|---|---|
| 5,676,397 | * | 10/1997 | Bauer . |
| 5,788,025 | * | 8/1998 | Nishide et al. . |
| 6,036,274 | * | 3/2000 | Kohlndorfer et al. . |

* cited by examiner

*Primary Examiner*—Milton Nelson, Jr.
(74) *Attorney, Agent, or Firm*—Tarrolli, Sundheim, Covell, Tummino & Szabo L.L.P.

(57) ABSTRACT

A belt tensioner for a vehicular seat belt, comprises a linear drive formed of a piston and a cylinder tube, and a belt engaging part connected to the piston by a deflected traction element. To provide a belt tensioner which can be more easily integrated in existing vehicle concepts, the belt engaging part is shiftingly guided in a guide fitting to be affixed flatly located to the vehicle body and the cylinder tube is affixed on or alongside the guide fitting.

8 Claims, 5 Drawing Sheets

BELT TENSIONER WITH LINEAR DRIVE

FIELD OF THE INVENTION

The invention relates to a belt tensioner for a vehicular seat belt, with a linear drive formed of a piston and a cylinder tube, and with a belt engaging part connected to the piston by a deflected traction element, as well as a belt tensioner with a tensioner drive and a belt engaging part being connected to the tensioner drive and the belt webbing.

BACKGROUND OF THE INVENTION

Belt tensioners are known in a wealth of variants, a distinction being made between rotary tensioners, usually arranged on a belt retractor, and linear tensioners inserted in the action line of the belt webbing. Linear tensioners are of a simple construction, but are often difficult to accommodate in the vehicle.

SUMMARY OF THE INVENTION

The invention provides a belt tensioner which can be more easily integrated in existing vehicle concepts. In accordance with the invention this is achieved in that the belt engaging part is shiftingly guided in a guide fitting to be affixed flatly located to the vehicle body and in that the cylinder tube is affixed on or alongside the guide fitting. According to the invention, this is also achieved by a belt tensioner with a tensioner drive and a belt engaging part being connected to the tensioner drive and the belt webbing, wherein a guide element is provided for progressively folding said belt webbing.

Due to the flat shape of the belt tensioner the latter can be affixed e.g. directly to the floor of a vehicle body, the necessary deflection of the belt webbing then being effected preferably by a belt webbing deflector element formed on the guide fitting.

In a first embodiment distinguished by a low profile, the belt engaging part is configured as a flat strap shiftingly received in a correspondingly flat guide passage of the guide fitting.

In a second embodiment distinguished by a short length, one end of the belt webbing is affixed to the guide fitting; the belt engaging part, in forming a loop, engages the belt webbing between the end of the belt webbing and a deflection part of the belt webbing.

By progressively folding the belt webbing with a guide element, the required space for accommodation of the folded belt webbing is reduced compared to a non-folded belt webbing. It is therefore possible to provide a more compact belt tensioner.

BRIEF DESCRIPTION OF THE DRAWINGS

Further advantages and features of the invention read from the following description of several embodiments and are evident from the drawing in which.

DESCRIPTION OF THE PREFERRED EMBODIMENTS

Figure 1:
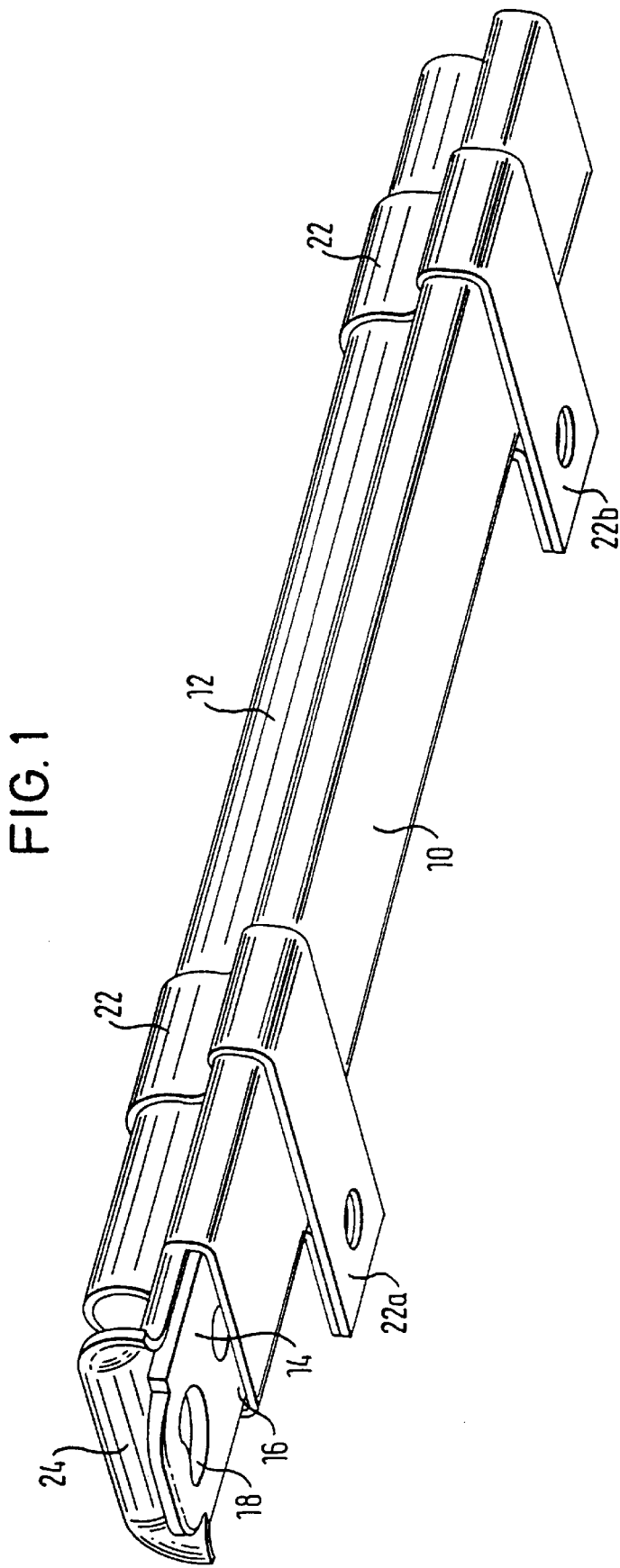
FIG. 1 is a perspective view of a first embodiment of the belt tensioner.
Figure 2:
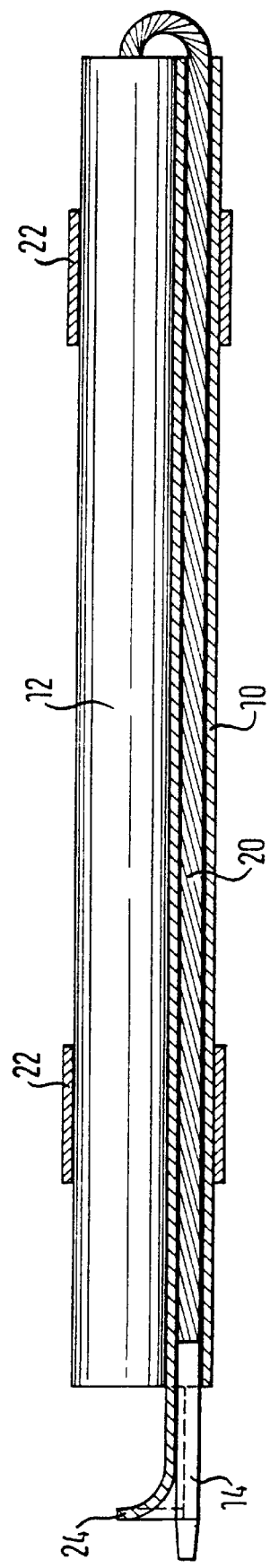
FIG. 2 is a schematic longitudinal section of the belt tensioner as shown in FIG. 1.

In the embodiment as shown in FIG. 1 the belt tensioner consists of a flat elongated guide fitting 10, a linear drive directly connected to the latter and having a cylinder tube 12 and a piston (not shown) shiftingly located therein, as well as of a belt engaging part in the form of a flat strap 14 shiftingly received in a correspondingly formed guide passage 16 of the guide fitting. The end of the strap 14 protruding from the guide passage 16 is provided with an eye 18 for looping in the belt webbing. The opposite end of the strap 14 is connected by a traction cable 20 (FIG. 2) to the piston in the interior of the cylinder tube 12. The traction cable 20 emerging from the end of the guide passage 16 is deflected through 180° and guided into the cylinder tube 12. The cylinder tube 12 is connected to the guide fitting 10 by two tubular clamp-like fastener parts 22, 24 provided with formed-on fastener straps 22a, 22b for direct attachment to the vehicle body.

Figure 4:
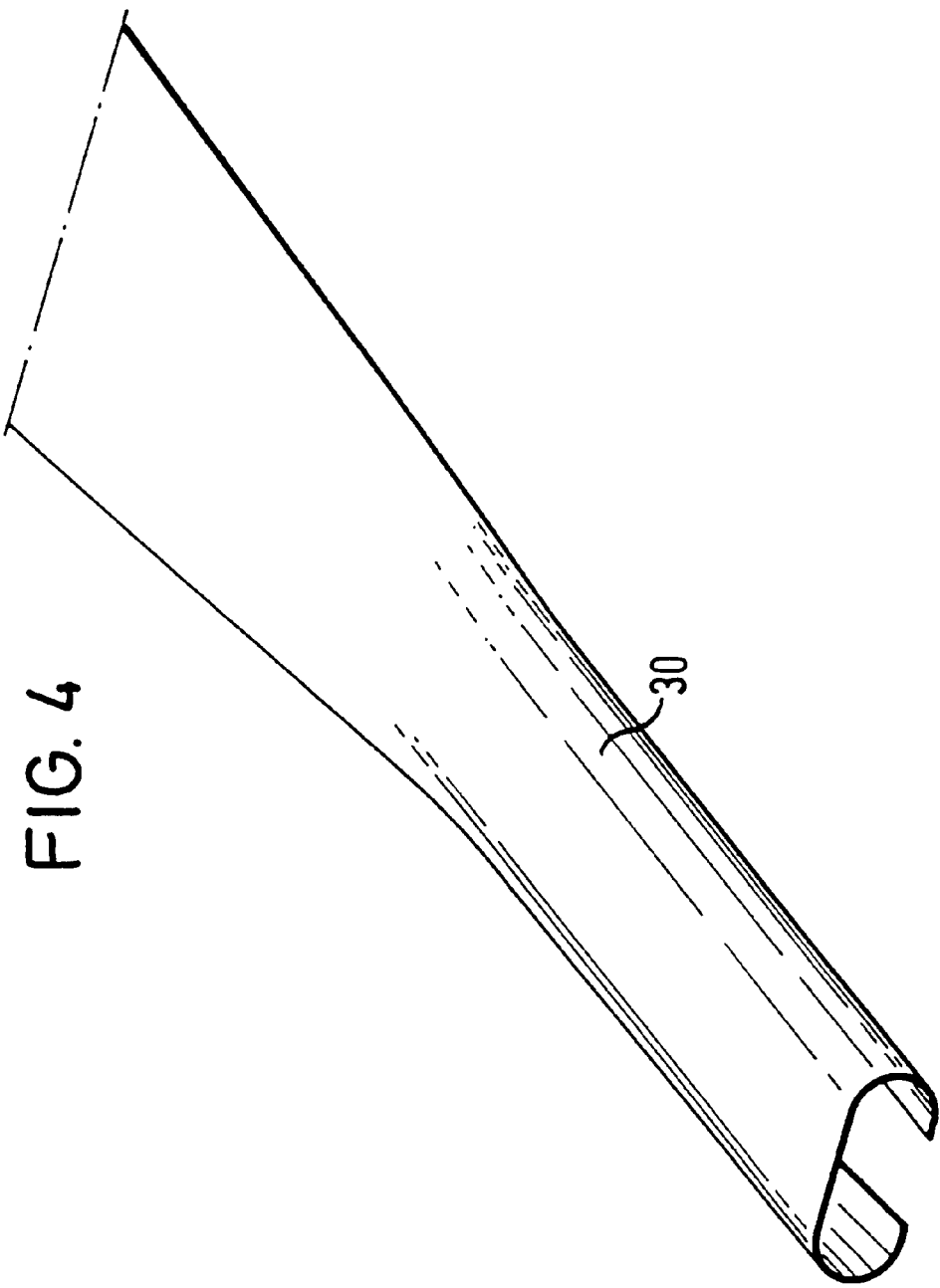
FIG. 4 is a schematic representation of how the belt webbing is deformed in entering the guide fitting.

At its end neighboring the strap 14, the guide fitting 10 is provided with a formed-on belt webbing deflector element 24. This belt webbing deflector element opens out into the guide passage 16 like a funnel, it being configured such that it simultaneously progressively deflects the belt webbing along the longitudinal edges of the latter along with the desired deflection of the belt webbing, as evident from FIG. 4, as a result of which the required width of the guide passage 16 can be reduced.

On activation of the belt tensioner, the piston in the interior of the cylinder tube 12 is acted upon by compressed gas and is driven to the opposite end of the cylinder tube. Via the traction cable 20, the strap 14 and therewith the belt webbing end affixed thereto is drawn into the guide passage 16. The movements of the piston in the interior of the cylinder tube 12, and of the strap in the interior of the guide passage 16 are in opposite direction. The stroke achievable by this variant of the belt tensioner corresponds to the length of the cylinder tube or guide fitting. The cylinder tube 12 can be arranged in any way on the guide fitting 10 or also alongside the latter, as a result of which a very low profile is achieved.

Figure 3:
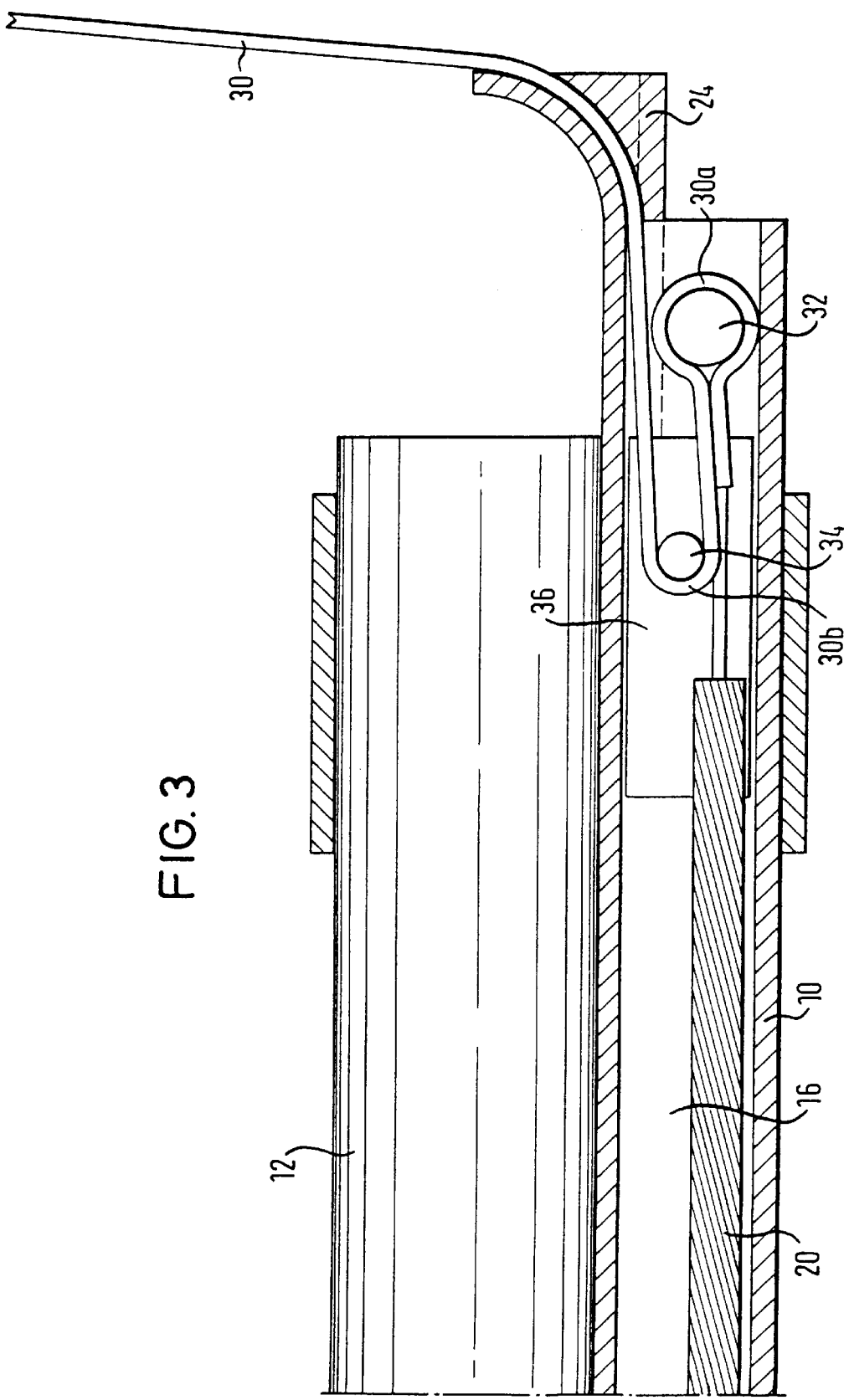
FIG. 3 is a partial view on a magnified scale of a second embodiment of the belt tensioner.

In the embodiment as shown in FIG. 3 one end of the belt webbing 30 is secured to the guide fitting 10. Affixing the end of the belt webbing is done by means of a loop 30a mounted on a peg 32 on the guide fitting 10. Between the end of the belt webbing 30 and the belt webbing deflector element 24, a pin or peg 34 engages the belt webbing in forming a loop 30b. This pin or peg 34 is affixed to a slider 36 shiftingly mounted in the interior of the guide passage 16 of the guide fitting 10, the traction cable 20 being coupled to this slider 36.

In this embodiment which due to the double-ply belt webbing in the guide passage 16 requires a somewhat higher profile than in the aforementioned embodiment, the overall length needed can be halved for a given stroke. In this embodiment too, the cylinder tube 12 can be arranged in any way on the guide fitting 10, it also being possible to arrange both parts so as to lie side by side.

Figure 5:
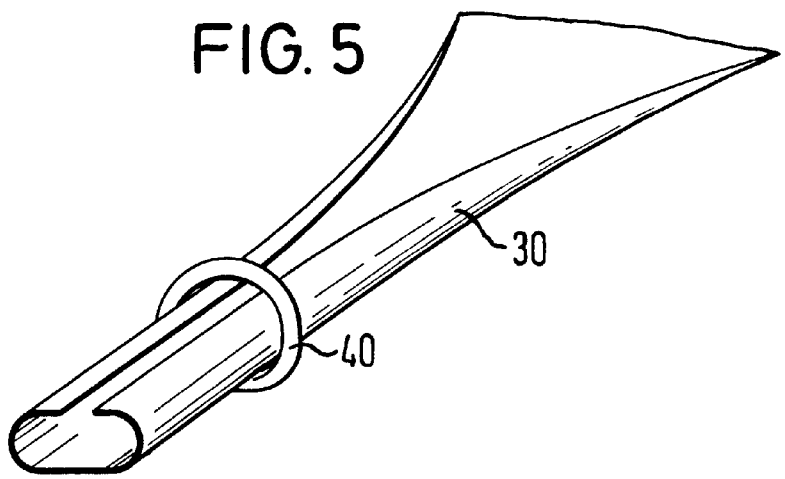
FIG. 5 is a ring-shaped guide element for folding the belt webbing.

FIG. 5 shows a ring-shaped guide element 40. By pulling the belt webbing 30 through the guide element 40, the belt webbing 30 is folded over into a U-shaped form.

Figure 6:
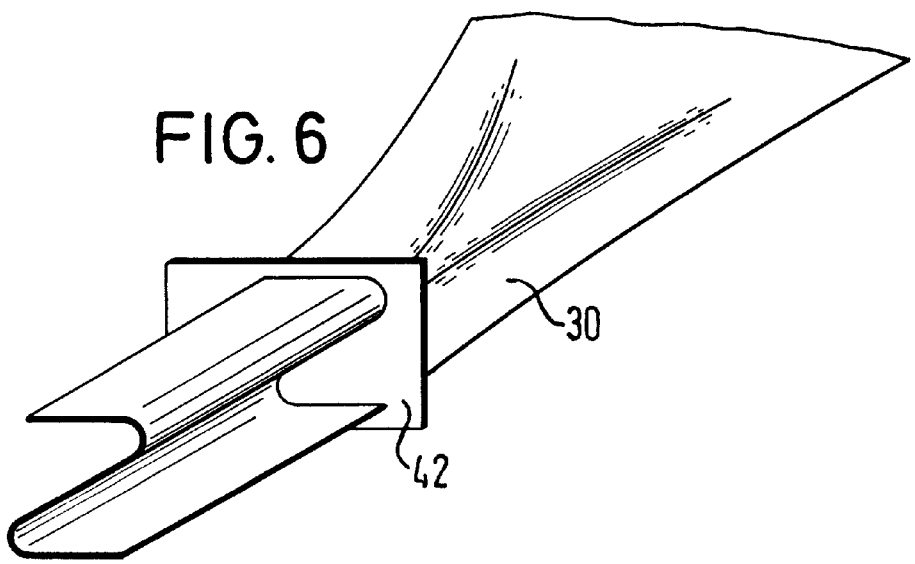
FIG. 6 is a further guide element for folding the belt webbing.
Figure 7:
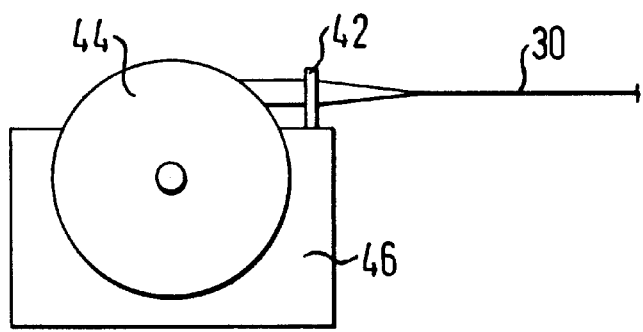
FIG. 7 is a further embodiment of the inventive belt tensioner.

FIG. 6 shows a guide element 42, by means of which the belt webbing 30 is folded over into a zigzag-shaped form, when the belt webbing 30 is pulled through the guide element 42.

What is claimed is:

1. A belt tensioner for a vehicle seat belt, comprising:
    a linear drive formed of a piston and a cylinder tube,
    a belt engaging part,
    a deflected traction element and a guide fitting,
    wherein said belt engaging part is connected to said piston by said deflected traction element,
    said belt engaging part is shiftingly guided in said guide fitting,
    said guide fitting is adapted to be affixed flatly located to a vehicle body and
    said cylinder tube is affixed to said guide fitting.

2. The belt tensioner as set forth in claim 1, wherein said traction element is deflected between said cylinder tube and said guide fitting through 180°.

3. The belt tensioner as set forth in claim 1, wherein said guide fitting is provided with a formed-on belt webbing deflector element.

4. The belt tensioner as set forth in claim 1, wherein said belt engaging part forms a flat strap shiftingly received in a correspondingly flat guide passage of said guide fitting.

5. A belt tensioner for a vehicle seat belt, comprising:
    a linear drive formed of a piston and a cylinder tube,
    a belt engaging part,
    a deflected traction element and a guide fitting,
    wherein said belt engaging part is connected to said piston by said deflected traction element,
    said belt engaging part is shiftingly guided in said guide fitting,
    said guide fitting is adapted to be affixed flatly located to a vehicle body and
    said cylinder tube is affixed alongside said guide fitting.

6. The belt tensioner as set forth in claim 5, wherein said traction element is deflected between said cylinder tube and said guide fitting through 180°.

7. The belt tensioner as set forth in claim 5, wherein said guide fitting is provided with a formed-on belt webbing deflector element.

8. The belt tensioner as set forth in claim 5, wherein said belt engaging part forms a flat strap shiftingly received in a correspondingly flat guide passage of said guide fitting.

\* \* \* \* \*